United States Patent [19]
Barron et al.

[11] 3,794,271
[45] Feb. 26, 1974

[54] SELF-ORGANIZING CONTROL SYSTEM

[75] Inventors: Roger L. Barron; Dixon Cleveland, both of Annandale, Va.

[73] Assignee: Adaptronics, Inc., McLean, Va.

[22] Filed: Jan. 31, 1972

[21] Appl. No.: 222,072

[52] U.S. Cl. ... 244/3.15, 340/172.5, 235/150.1 API, 235/150 OPT, 244/77 M
[51] Int. Cl. ............................................. F41q 7/00
[58] Field of Search ............... 244/3.15, 77 M, 3.23; 340/172.5; 235/150.1 API, 150 OPT

[56] References Cited
UNITED STATES PATENTS

| | | | |
|---|---|---|---|
| 3,411,736 | 11/1968 | Kelly | 244/3.15 |
| 3,414,215 | 12/1968 | Martin et al. | 244/3.15 |
| 3,437,288 | 4/1969 | Do Mau Lam | 244/3.15 |

*Primary Examiner*—Samuel Feinberg

[57] ABSTRACT

This disclosure relates to improvements in self-organizing control logic configurations having particular application to automatically or remotely piloted vehicles. The improvements include the use of multiple-point (time-distributed) functions for control system performance assessment, the use of performance assessment value-signal magnitude information to govern parameter step sizes, and means for controlling an object that is rotating with a determinable angular rate but unknown phase angle relative to a fiducial angular position of the object.

15 Claims, 6 Drawing Figures

SELF-ORGANIZING CONTROL SYSTEM

The invention relates to the application to automatically or remotely piloted vehicles of improvements in self-organizing control (SOC) logic configurations that enhance the effectiveness of the control systems. The improvements include: (a) the use of multiple-point (time-distributed) functions for control system performance assessments, (b) the use of performance assessment value-signal magnitude information to govern parameter step sizes, and (c) means for controlling an object that is rotating with a determinable angular rate but unknown phase angle relative to a fiducial angular position of the object, said means incorporating first means for computing the performance of the SOC in accordance with variations of control system response as appearing in a system error signal, second means for estimating the phase angle of the object in accordance with a correlation between changes in the system performance computed by said first means with changes in the estimated phase angle, and third means for generating signals that actuate the controlled object in accordance with said estimated phase angle from said second means. These and other concepts are discussed below.

The published literature on self-organizing control describes SOC techniques that use single-point determinations of v, the performance assessment (PA) value signal, and considers only the polarity of this signal. This invention relates to the use of multi-point performance assessment (PA) algorithms and establishes the parameter step sizes by using value-signal magnitude information. These logic conceptions have a great deal of utility for aerospace applications, as well as for controls in industry, for the following reasons:

a. The sampling rate of the SOC can be significantly reduced, with consequent easing of bandwidth requirements on electronic circuits.
b. Tolerance to sensor noise is improved and requirements for sensor resolution are relaxed.
c. The SOC adapts to much wider ranges of gains and frequencies of the controlled objects.

In addition, techniques have been devised that operate in conjunction with the other logic refinements mentioned above to reduce steady-state hunting exhibited by the SOC to a negligible amplitude in those applications not involving large transport delays.

In the published literature, the correlation process used by the SOC is that expressed by the equation $$\Delta p = |\Delta p| \, (sgn \, v) \, (sgn \, \Delta u) \quad (1)$$

where:

$\Delta p$ = increment to probability, $p$, that the next $\Delta u > 0$ $|\Delta p|$ = constant (non-zero if $p_{min} < p < p_{max}$, zero if $p = p_{min}$ or if $p = p_{max}$)

$sgn \, v$ = polarity of value signal, $v$
$sgn \, \Delta u$ = polarity of last increment to control signal, $u$ The value signal polarity has been computed from the relationship $$sgn \, v = (- sgn \, e_p)(sgn \, \ddot{e}_p) \quad (2)$$

in which $e_p \equiv e + T\dot{e}$ is the predicted (extrapolated) control system error, where e is the instantaneous control system error. To compute $sgn \, \ddot{e}_p$ it has been necessary to determine the third derivative of the controlled-object response, and this has imposed rather stringent demands on system hardware.

More generally, one has $$\Delta p = K \, \tilde{v} \, \Delta \tilde{u} \quad (3)$$

in which
$K$ = positive constant
$\tilde{v}$ = multi-point value signal
$\Delta \tilde{u}$ = multi-point experiment history

Multi-Point Value Signal

Although no real system can compute a derivative in zero time (i.e., by using true infinitesimals of displacement and time), prior SOC practice has been to employ high-bandwidth sensors and electronic circuitry so that the limiting case of a pure derivative is approached quite closely in terms of the natural time constants of the physical system. Unfortunately, for many applications the bandwidth requirements imposed by system performance specifications are not readily satisfied by available hardware, particularly that suitable for low-cost systems.

In accordance with this invention, there are provided techniques whereby a multi-point value signal, $\tilde{v}$, can be computed and used in the SOC. The multi-point value signal, as its name suggests, is one that is calculated from a number of time-distributed samples of the system response variable(s). The fundamental idea in this technique is to compute an estimate, $\hat{E}_n$, of a variable indicative of the control system response which would have existed at time $t_n$ had the system continued on the path it was following prior to the most recent control actions. The numerical difference between this estimate and the actual system response at time $t_n$, denoted $E_n$, that is measured is thereby indicative of whether these recent actions improved or worsened the behavior of the system. Thus, symbolically $$\tilde{v} = \hat{E}_n - E_n \quad (4)$$

where (for the present discussion only) it is assumed that $\hat{E}_n$ and $E_n$ are both always non-negative functions of time.

One embodiment is a quadratic formula for calculation of $\hat{E}_n$:

$$\hat{E}_n = 3E_{n-1} - 3E_{n-2} + E_{n-3} \quad (5)$$

whence $$\tilde{v} = E_{n-3} - 3E_{n-2} + 3E_{n-1} - E_n \quad (6)$$

Note that the coefficients in this last equation follow the rule of Pascal's triangle. This rule can be employed to write multi-point relationships that link any arbitrary number, $k$, of past points, each point separated from its immediate neighbors by time intervals $\Delta t$.

Other formulas for $\tilde{v}$ could be obtained by deriving, say, the quadratic polynomial that is a least-squares fit to the latest $k$ data samples (where, in this instance, $k$ may be quite large). However, the extrapolation properties of any such formulas must be substantiated.

In general, the $k$-point PA value signal in accordance with the present invention may be expressed:

$$\tilde{v} = \sum_{i=n-k}^{i=n} C_i E_i \tag{7}$$

Multi-Point Experiment History

The SOC correlation logic separates causal from extraneous trend information by integrating a plurality of $\Delta p$'s. Thus, random environmental factors are ignored, on the average, whereas the significant response characteristics of the plant are identified. In correlations performed with a multi-point performance value signal, it is important to compute a measure of recent control actions that is properly indicative of the pattern of these actions. Obviously, the earlier the action, within limits, the greater its influence on both $\hat{E}_n$ and $E_n$. The last action taken, that is, the most immediate prior $\Delta u$, has the least over-all influence on $\hat{E}_n$ and $E_n$, but it may be the most important action taken in terms of the numerical difference between $\hat{E}_n$ and $E_n$.

Accordingly, a weighted sum of the recent $\Delta u$'s is utilized, viz.

$$\Delta \tilde{u} = w_{-1} \Delta u_{n-1} + w_{-2} \Delta u_{n-2} + \ldots + w_{-k} \Delta u_{n-k} \tag{8}$$

The non-negative weights; $w_{-1}, w_{-2}, \ldots, w_{-k}$; may be selected in accordance with the harmonic sequence (such that $w_{-1} = 1$, $w_{-2} =$ one-half, $\ldots$, $w_{-k} = 1/k$.

Automatic Adjustment of SOC Experiment Step Sizes

Use of fixed values of $|\Delta u|$, the SOC experiment step size, has, in the past, limited the ranges of controlled-object gains and frequencies over which a given SOC could function. The dynamic range of differentiation circuits also has been a severely limiting factor, but this latter problem is largely overcome by the multipoint techniques just outlined. In accordance with the present invention, automatic adjustment of $\Delta u$ is provided by reference to the magnitude of $\tilde{v}$.

The following algorithm is used:
Step 1. Compute $|\tilde{v}_n|$.
Step 2. If $|\tilde{v}_n| < |\tilde{v}_{min}|$, set $|\Delta u_n| = f_B |\Delta u_{n-1}|$, where $f_B > 1$.
Step 3. If $|\tilde{v}_n| > |\tilde{v}_{max}|$, set $|\Delta u_n| = f_S |\Delta u_{n-1}|$, where $f_S < 1$.
Step 4. However, if $|\tilde{v}_{min}| \leq |\tilde{v}_n| \leq |\tilde{v}_{max}|$, use $|\Delta u_n| = |\Delta u_{n-1}|$.

In this way, the magnitude of the parameter is increased (geometric growth rate) until the minimum acceptable $|\tilde{v}|$ is achieved. This insures observability in the controls sense. Likewise, the parameter magnitude is decreased (geometric decay rate) if necessary to avoid excessively large $|\tilde{v}|$. This keeps the disturbances introduced by the SOC experiments from being larger than necessary.

Estimating Unknown Phase Angle of Controlled Rotating Object and Generating Actuation Signals in Accordance Therewith In many control system applications, a controlled object is rotating at a known or measurable rate but with an unknown phase angle about a given body axis, here denoted the $x$ or roll axis, and control of pitch and yaw motions is to be established by producing torques about orthogonal axes, $y$ and $z$, respectively, which are fixed in the body perpendicular to the $x$ axis and therefore rotate with the body. Automatically or remotely controlled flight vehicles may fit within this category. More generally, any system or process having an unknown phase angle that is to be identified via a self-organizing control method is amenable to the following approach.

A Ring Counter is implemented, such that its content, $\phi_n^*$, is indicative at any instant, $t_n$, of the current best estimate of the unknown phase angle parameter. This output signal is transferred to a summing device having as its other input the time integral of the known or measurable value of the angular rate (e.g., the roll rate) of the system. The output of this summing device constitutes the instantaneous estimate of the angular position (e.g., roll attitude) of the system, and this angular position estimate is transferred to sine and cosine computing elements to obtain time-varying waveforms having suitable actuation properties, as discussed further herein below. The input to the Ring Counter is an increment, $\Delta \phi_n^*$, generated by self-organizing control logic, as discussed in detail herein below.

Other Factors

Nearly quiescent steady-state operation of the SOC is achieved by use of a variable gain, $G(E, \dot{E})$, on the $u$ signal, followed by an augmented integrator of the form (in LaPlace transform notation) $1 + 1/T_i s$. A representative relationship for the variable gain is $$G_n = [E_n^2 + (\tau \dot{E}_n)^2]^{1/2} + G_{min} \tag{9}$$

where $G_{min} \approx 0$. The integrator causes the system to migrate to the level at which $G \approx 0$, thus producing the requisite steady-state force (or torque) without significant variations in output

Objects

It is therefore an object of the invention to provide a method and means for supplying a multi-point value signal in a self-organizing control system.

It is a further object of this invention to provide a method and means for supplying a multi-point experiment history in SOC correlation logic.

It is a yet further object of this invention to provide a method and means for automatic adjustment of step size of experiments conducted by an SOC.

It is a yet further object of this invention to provide a method and means for estimating the unknown phase angle of a rotating object and generating a control signal in accordance therewith.

The above objects and still further objects of the invention will immediately become apparent to those skilled in the art after consideration of the following preferred embodiment thereof, which is provided by way of example and not by way of limitation. wherein.

FIGURES

DISCUSSION

Figure 1:
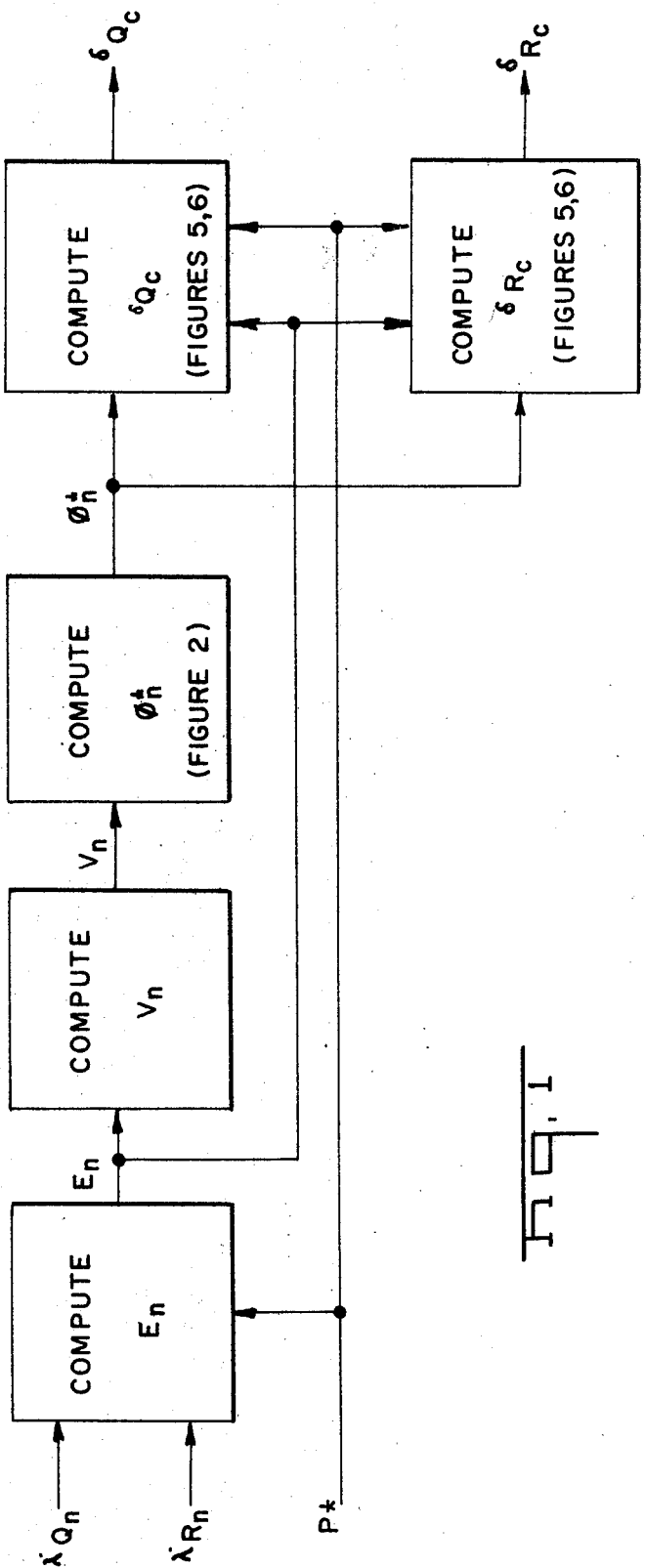
FIG. 1 is a block diagram of a self-organizing controller in accordance with the present invention.

Referring now to FIG. 1, the first block implements the computation of $E_n$, a variable indicative of the control system response. In the application of the improvements discussed herein to the control of a rolling vehicle that is guided by reference to line-of-sight (LOS) angular rate components, $\lambda_Q$ and $\lambda_R$, relative to rotating body pitch and yaw axes, respectively, a preferred embodiment of the function $E_n$ is given by the following relationship $$E_n = [(\lambda_{Q_n} + \lambda_{R_n} - \lambda_{R_{n-1}}/\Delta t p^*)^2 + (\lambda_{R_n} - \lambda_{Q_{n-1}}/\Delta t P^*)^2]^{1/2} \quad (10)$$

wherein $\Delta t$ is the time interval between $t_n$ and $t_{n-1}$, and $P^*$ is the known or measured roll rate. It is seen that Equation 10 provides positive semi-definite form for the quantity $E_n$. The method of PA discussed herein below requires such a form, but it is not necessary that the specific function of Equation 10 be implemented, and other embodiments will be apparent to those skilled in the art. The essential consideration is that of two time histories of $E_n$, that which decreases or increases more slowly is the preferred time history, the object of the improved self-organizing control system being (in this instance) to change $E_n$ toward zero, if possible, and in any event, to slow the rate of increase in $E_n$ so that this variable has a smaller magnitude in the presence of the control actions by the SOC than it would have had otherwise.

The second block in FIG. 1 implements the PA logic in accordance with a relationship of the form $$\tilde{v} = \sum_{i=n-k}^{i=n} C_i E_i \quad (11)$$

for which a special embodiment is $$v_n = E_{n-3} - 3E_{n-2} + 3E_{n-1} - E_n \quad (12)$$

Figure 2:
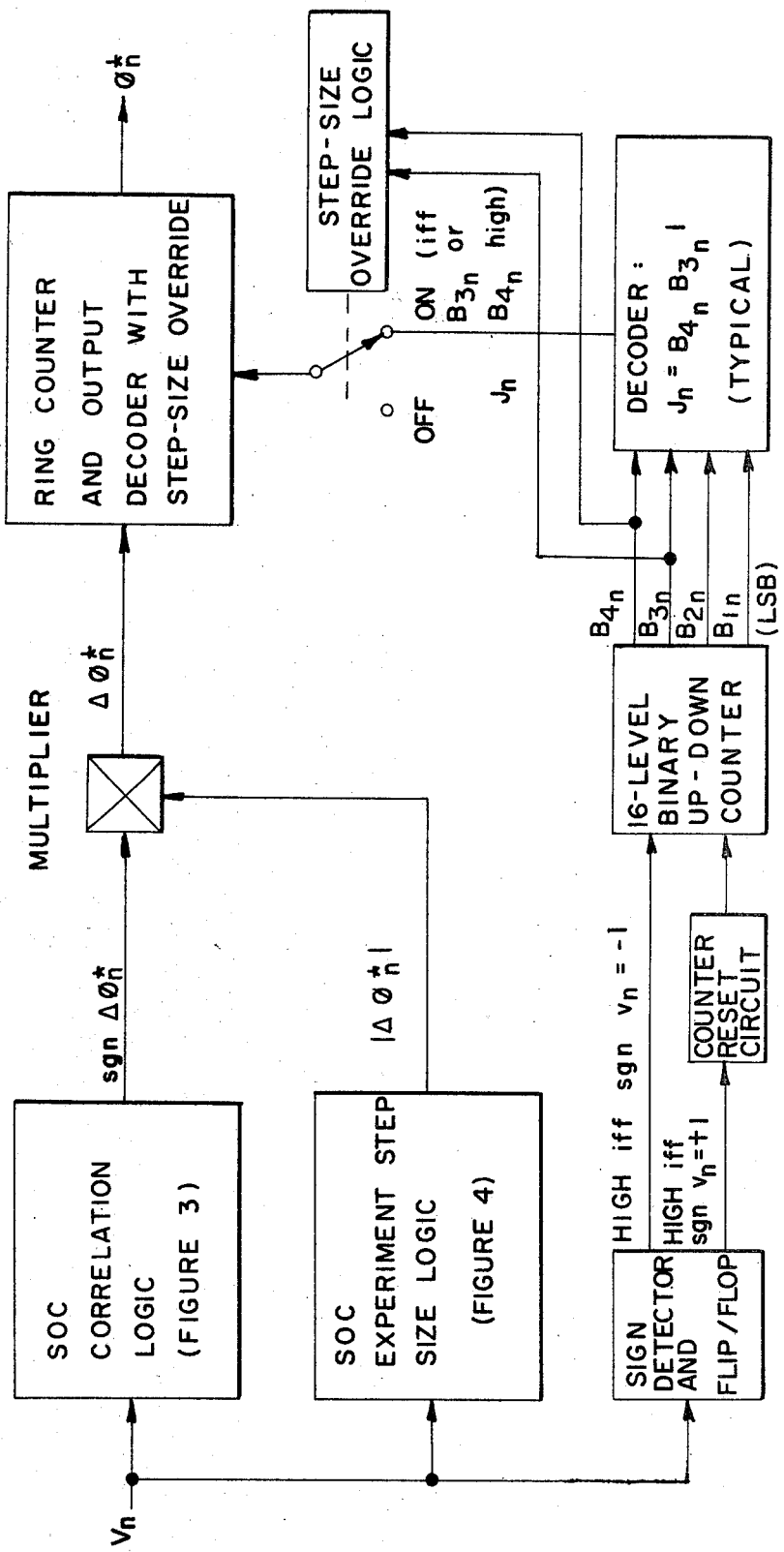
FIG. 2 is a diagram of the interrelation among FIGS. 3 to 5, also showing the use of a Ring Counter, the content of which is the estimated phase angle of a controlled rotating object.
Figure 3:
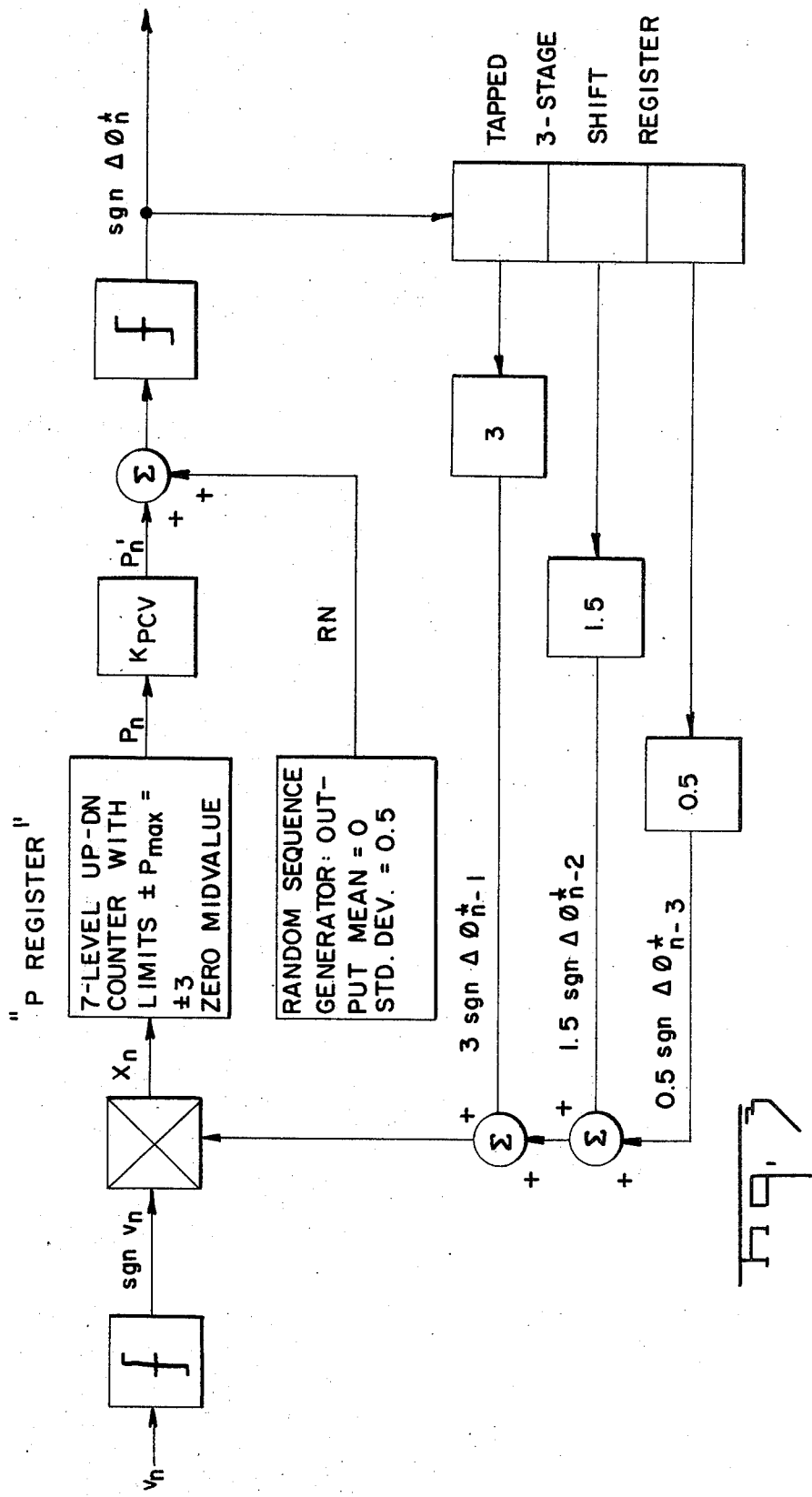
FIG. 3 is the SOC Correlation Logic for determination of the polarity of experimental changes in the estimated phase angle of a controlled rotating object.
Figure 4:
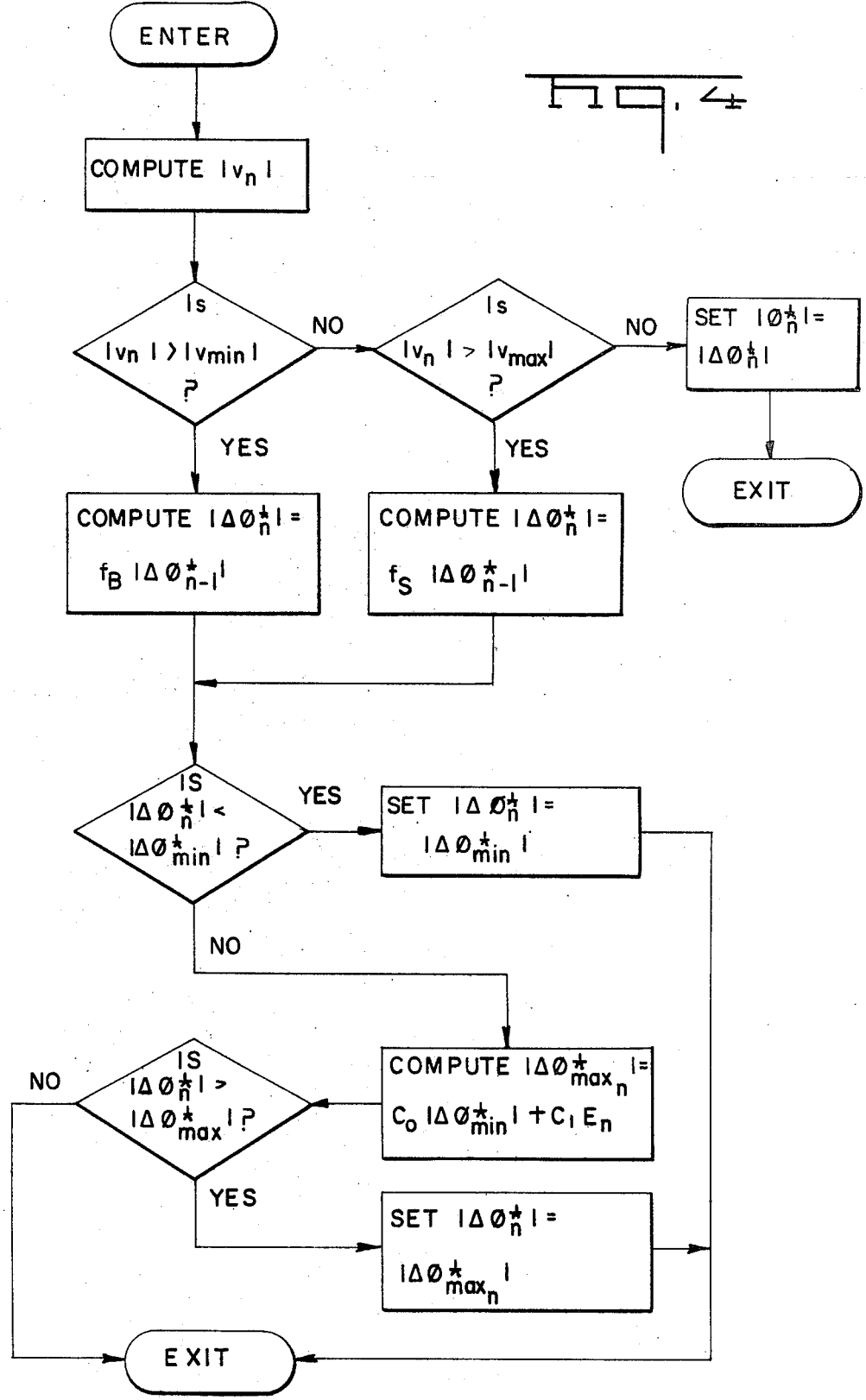
FIG. 4 is a flow chart showing a method for computation of the SOC experiment step sizes used in estimating the phase angle of the controlled rotating object.

The third block within FIG. 1 realizes the computation $\phi_n^*$ in accordance with the present invention, and the logic of this computation is shown in detail in FIGS. 2, 3, and 4.

FIG. 2 illustrates the use of the Ring Counter in accordance with the present invention, whereby the input signal, $\Delta\phi_n^*$, is obtained by multiplying a polarity variable, sgn $\Delta\phi_n^*$, by a magnitude variable, $|\phi_n^*|$. The polarity variable is obtained within the SOC Correlation Logic as shown in FIG. 3 and the magnitude variable is obtained within the SOC Experiment Step Size Logic as shown in FIG. 4. Both these logic elements receive the value signal input $v_n$ obtained in accordance with the PA method and means discussed herein above. The Ring Counter has as its content a coded value of the estimated phase angle, $\phi_n^*$, and decoder logic is used to obtain this phase angle. In accordance with the present invention, the phase angle is taken to be proportional to the content of the Ring Counter; i.e., as a binary bit moves around an otherwise "empty" counter, this bit signifies by its position in the counter the instantaneous estimate of the phase angle. As shown in FIG. 2, Step Size Override Logic is used to increase the increment magnitude within the Ring Counter if a sequence of eight or more unsuccessful estimates have been made. In this context, an unsuccessful estimate is taken to be one in which sgn $v_n = -1$. Furthermore, the size of step called for by the Step Size Override Logic can be made to depend upon the number of unsuccessful experiments conducted in an uninterrupted succession of such experiments. The logic for a preferred embodiment of said override means is shown in FIG. 2.

FIG. 3, illustrating the SOC Correlation Logic, diagrams a novel means for implementation of a weighted sum of prior step polarities employed by the Correlation Logic. The specific numerical weights shown are those of a preferred but not necessary embodiment. The weights are applied to binary output of a tapped shift register, and the weighted sum is multiplied by sgn $v_n$ to obtain the probability bias signal, $x_n$, that is, in turn used in the way disclosed by Roger L. Barron in U.S. Pat. No. 3,460,096 (Self-Organizing Control System).

FIG. 4 is a logic flow chart presented in accordance with the present invention to diagram a novel method for selection of SOC experiment step sizes as a function of $v_n$. As is seen from this diagram, if the magnitude $v_n$ is less than a threshold value $|v_{min}|$, the step size is increased up to a predetermined limit in accordance with a geometric growth procedure. Conversely, if the magnitude of $v_n$ is greater than a threshold $|v_{max}|$, the step size is decreased to a predetermined lower limit in accordance with a geometric decay law. In FIG. 4, $f_B$ is greater than unity, $f_S$ is less than unity so as to realize geometric growth and decay histories.

Figure 5:
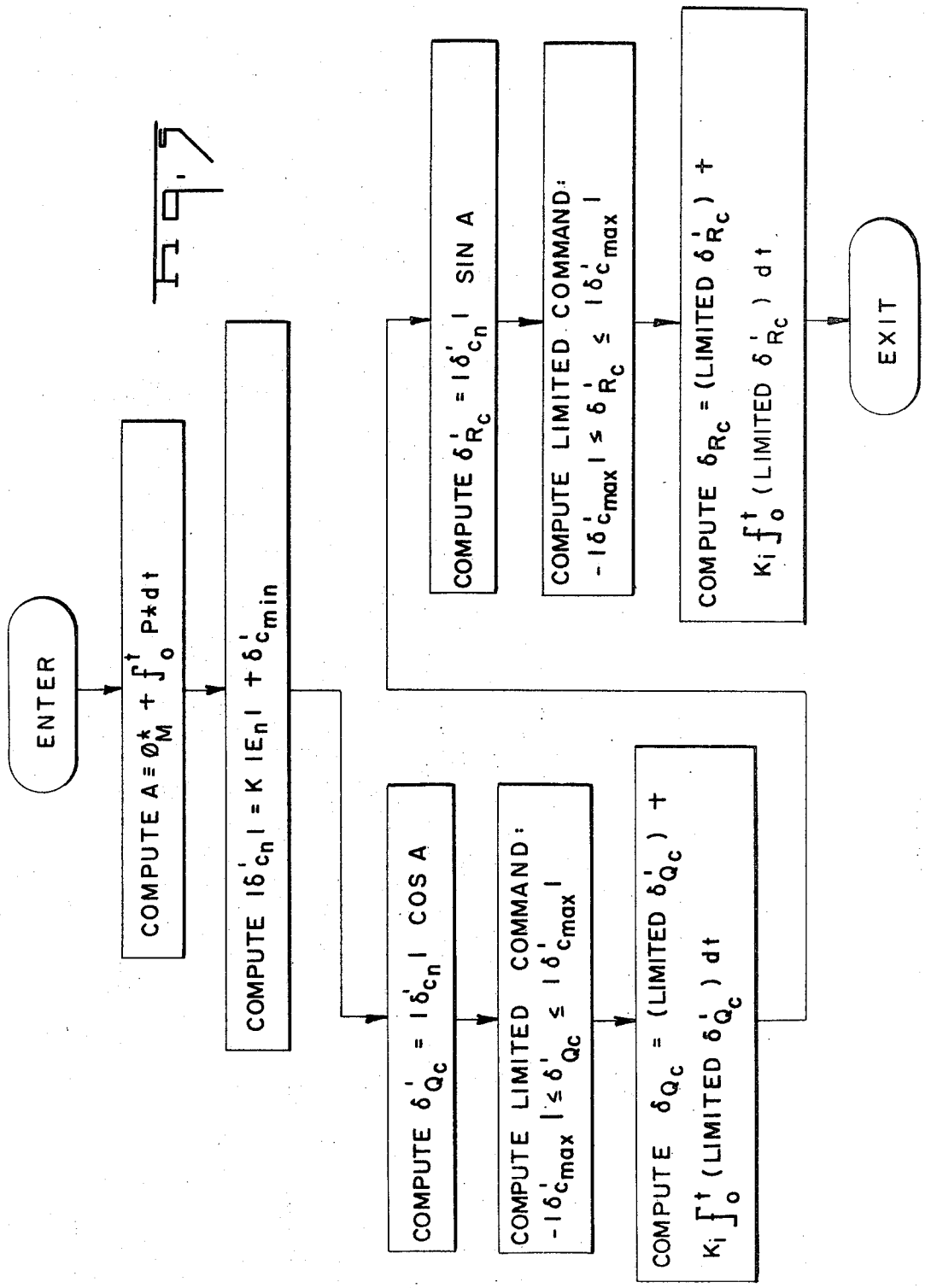
FIG. 5 is a flow chart of a method for generating sinusoidally-varying and cosinusoidally-varying signals having a phase angle estimated in accordance with the invention and frequency and amplitude determined in accordance with the present invention.
Figure 6:
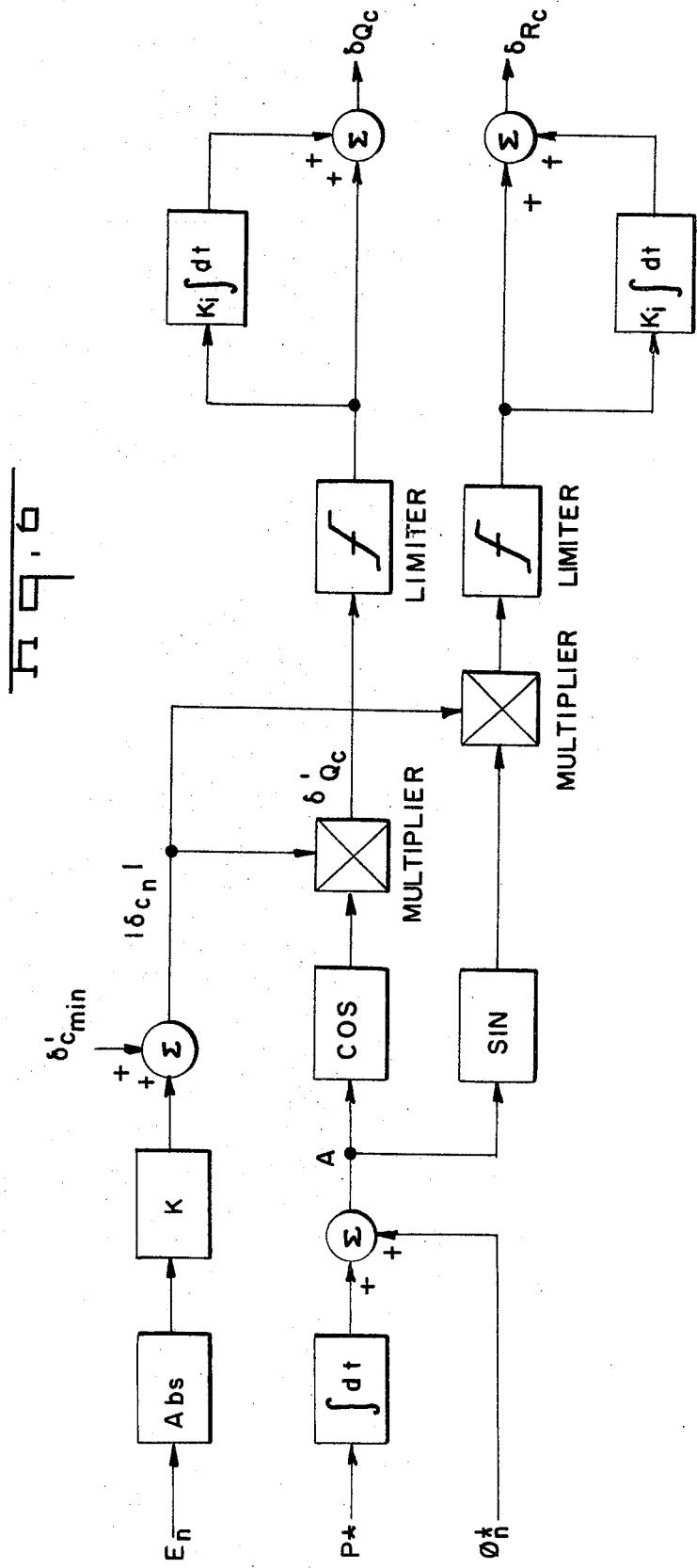
FIG. 6 is a functional block diagram of circuitry for performing the method of FIG. 5.

FIGS. 5 and 6 diagrams a method and means for computing vehicle actuator commands $\delta_{Q_c}$ and $\delta_{R_c}$ relative to body-mounted (i.e., roll) pitch and yaw actuators, respectively. It is readily seen from these figures that the actuator commands consist of limited cosinusoidally-varying and sinusoidally-varying waveforms, respectively, which vary with the known or measured roll rate, $P^*$, and which have an instantaneous phase angle, $\phi_n^*$, relative to a fiducial reference. Furthermore, within predetermined limits thereon the magnitudes of the cosinusoidal and sinusoidal excitation signals are determined in accordance with the following function of $E_n$ $$|\delta'_{c_n}| = K|E_n| + \delta'_{c_{min}} \quad (13)$$

which represents a preferred embodiment but not a unique magnitude determining relationship. In accordance with Equation 13, the magnitude increases for increasing $E_n$, but is always equal to or greater than a predetermined minimum level.

The augmented integrators in the output lines of the limiters (see FIG. 6) are useful for cases of small P* as a means for eliminating any steady-state following errors.

APPENDIX

The following is a program for simulating the controller of the present invention and the dynamics of a controlled plant as run on an EAI-640 computer:

```
C--SCC-CLGP
      REAL LDM,LDDM,LD,LDD,LDB,KT,KE,KI,KPCV
      LOGICAL SENSW
      COMMON /INPUT/ DT,PS1,P,C,FS,FB,PHIMIN,CO,C1,KPCV,RBASEO,
     * VMN,VMX,DELCMN,DCPMX,DQDMX,DRDMX,DQMX,DRMX,PHO,OMG1,OMG2,V,
     * R,PHIMGO,KI,B0,B1,B2,B3,KE,KT,
     * K,NEN,NPRNT
C
50    CALL TYPIN(DT,32,K,3)
      DT3 = DT**3/6.
      DT2 = .5*DT
      IF (SENSW(8)) GO TO 100
      LD = 0.
      LDM = 0.
      LDDM = 0.
      KNTR = 0
      INIT = 0
      G = -1.
      GD = 0.
      GDD = 0.
      DGD = 0.
      DRD = 0.
      DQ = 0.
      DR = 0.
      BQ = 0.
      BR = 0.
      T = 0.
      RBASE = RBASEO
      EI = 0.
      PHI = 0
      A = 0.
      PH = 0.
      DELC = 0.
      DV = 0.
      VN = 0.
      PHIMAG = 0.
      PHISGN = 0.
      XN = 0.
      PN = 0.
      DQCP = 0.
      DRCP = 0.
      DQC = 0.
      DRC = 0.
      DV = 0.
      DVD = 0.
      DVDD = 0.
      GDDD = 0.
      LDB = 0.
100   IF (MOD(KNTR,NPRNT).NE.0) GO TO 110
      IF (SENSW(1)) TYPE 1000, T,EI,G,PHI,A,PH,LD
1000  FORMAT (/F6.3,6F10.4)
      IF (SENSW(2)) TYPE 1010, DQ,GD,DELC,DV,VN,PHIMAG,PHISGN
1010  FORMAT (6X,6F10.4,F4.0)
      IF (SENSW(3)) TYPE 1020, T,XN,PN,DQCP,DRCP,DQC,DRC,DGD,DRD,DV,
     * DVD,DVDD,GDD,GDDD,LDB,LDM,LDDM
```

```
1020    FORMAT (6X,6F10.4)
110     EI = SQRT(LDM**2 + (LDDM/PST)**2)
        IF (INIT.EQ.0) EIST = EI
        EIST = C*EI + (1.-C)*EIST
        IF (MOD(KNTR,K).EQ.0) CALL CNTRL (EIST,NEN,FS,FE,PHIMIN,CO,C1,
       * KPCV,RBASE,PHI,INIT,VMN,VMX,PHIMGO,VN,PHIMAG,PHISGN,XN,PN)
        A = PST*T + PHI
        DELC = DELCMN + KE*EIST
        DQCP = DELC*COS(A)
        IF (ABS(DQCP).GT.DCPMX) DQCP = SIGN(DCPMX,DQCP)
        BQ = BQ + DT*KI*DQCP
        DQC = DQCP + BQ
        DRCP = DELC*SIN(A)
        IF (ABS(DRCP).GT.DCPMX) DRCP = SIGN (DCPMX,DRCP)
        BR = BR + DT*KI*DRCP
        DRC = DRCP + BR
        DQDD = DQC - 100.*DQD - 10000.*DQ
        DQD = DQD + DQDD*DT
        IF (ABS(DQD).GT.DQDMX) DQD = SIGN(DQDMX,DQD)
        DQ = DQ + DT*(DQD + DT2*DQDD)
        IF (ABS(DQ).GT.DQMX) DQ = SIGN(DQMX,DQ)
        DRDD = DRC - 100.*DRD - 10000.*DR
        DRD = DRD + DRDD*DT
        IF (ABS(DRD).GT.DRDMX) DRD = SIGN(DRDMX,DRD)
        DR = DR + DT * (DRD + DT2*DRDD)
        IF (ABS(DR).GT.DRMX) DR = SIGN(DRMX,DR)
        PH = P*T + PHO
        SINPH = SIN(PH)
        COSPH = COS(PH)
        DV = DQ*COSPH - DR*SINPH
        DVD = (DQD - P*DRD)*COSPH - (DRD + P*DQD)*SINPH
        DVDD = (DQDD - P*DRDD - P**2*DQD)*COSPH
       *       - (DRDD + P*DQDD - P**2*DRD)*SINPH
        CDDD = DVDD + OMG1*DVD + OMG1**2*DV - 1.2*OMG2*CDD -OMG2**2*CD
        CDD = CDD + CDDD*DT
        GD = GD + DT*(GDD + DT2*GDDD)
        G = C + DT*(GD + DT2*GDD) + DT3*GDDD
        LDD = V*(GD + LD)/(R*(1.-T/10.))
        LD = LD + LDD*DT
        LDB = BO + B1*T + B2*COS(P*T) + B3*SIN(P*T)
        LDDM = KT*(LD + LDB - LDM)
        LDM = LDM + LDDM*DT
        IF (T.GE.10.) PAUSE 777
        T = T + DT
        KNTR = KNTR + 1
        IF (SENSW(7)) GO TO 50
        GO TO 100
        END
C--CONTROL SUBROUTINE
        SUBROUTINE CNTRL (FN,NEN,FS,FE,PHIMIN,CO,C1,KPCV,RBASE,PHI,
       * INIT,VMN,VMX,PHIMGO,VN,PHIMAG,PHISGN,XN,PN)
        REAL KPCV
        LOGICAL SENSW
        DIMENSION ENK(5),W(3)
        DATA PMAX /3./
        IF (INIT.NE.0) GO TO 105
        PHI = 0.
        PHIMAG = PHIMGO
        PN = 0.
        DO 100 I=1,5
100     ENK(I) = 0.
        DO 101 I=1,3
```

```
101     W(1) = 1.
        INIT = 1
105     RX = RBASE
C--KEEP PAST E VALUES, NEN
        DO 110 I=1,NEN
        J = NEN-I+1
110     ENK(J+1) = ENK(J)
        ENK(1) = EN
C--COMPUTE VN
        VN = ENK(4) + 3.*(ENK(2)-ENK(3)) - EN
C--COMPUTE PHI MAGNITUDE
        ABSVN = ABS(VN)
        IF (ABSVN.LT.VMN) GO TO 115
        IF (ABSVN.LE.VMX) GO TO 130
        PHIMAG = FS*PHIMAG
        GO TO 120
115     PHIMAG = FB*PHIMAG
120     IF(PHIMAG.GE.PHIMIN) GO TO 125
        PHIMAG = PHIMIN
        GO TO 130
125     PHIMAX = CO*PHIMIN + C1*EN
        IF(PHIMAG.GT.PHIMAX) PHIMAG = PHIMAX
C--COMPUTE PHI SIGN
130     XN = (3.*W(1) + 1.5*W(2) + .5*W(3))*SIGN(1.,VN)
        W(3) = W(2)
        W(2) = W(1)
        PN = PN + XN
        IF (ABS(PN).GT.PMAX) PN = SIGN(PMAX,PN)
        PHISGN = SIGN(1.,KPCV*PN+ENORM(RX))
        W(1) = PHISGN
C--COMPUTE PHI
        PHI = PHI + PHISGN*PHIMAG
        RBASE = RX
        RETURN
        END
```

Though the invention has been described with respect to a specific embodiment thereof, many variations and modifications will immediately become apparent to those skilled in the art. It is therefore the intention that the appended claims be interpreted as broadly as possible in view of the prior art to include all such variations and modifications.

We claim:

1. In a self-organizing control system for controlling a controllable object which is rotating at a determinable angular rate and unknown phase angle relative to a fiducial angular position of said object,
   a. first means responsive to variations of control system response for providing an error signal which is computed from said variations of control system response,
   b. second means responsive to said error signal and changes in the estimated phase angle of said object for estimating the phase angle of said object, and
   c. third means responsive to said estimated phase angle to provide actuation signals to control said controllable object.

2. A self-organizing control system as set forth in claim 1 wherein said first means includes fourth means to compute said error signal by sampling a plurality of time-distributed samples of the response of said control system, said fourth means incorporating the sum of numerically weighted values of said samples taken at finite time intervals.

3. A self-organizing control system as set forth in claim 1 wherein said second means includes fifth means for incorporating the product of a function of said error signals and the sum of numerically weighted values of samples of said estimated phase angle taken at finite time intervals.

4. A self-organizing control system as set forth in claim 2 wherein said second means includes fifth means for incorporating the product of a function of said error signals and the sum of numerically wieghted values of samples of said estimated phase angle taken at finite time intervals.

5. A self-organizing control system as set forth in claim 1 wherein said second means includes means for incorporating the product of a function of changes in said estimated phase angle and a function of said error signal.

6. A self-organizing control system as set forth in claim 2 wherein said second means includes means for incorporating the product of a function of changes in said estimated phase angle and a function of said error signal.

7. A self-organizing control system as set forth in claim 3 wherein said fifth means includes a ring counter and sixth means for computing the estimated phase angle as a function of the contents of said ring counter.

8. A self-organizing control system as set forth in claim 4 wherein said fifth means includes a ring counter and sixth means for computing the estimated phase angle as a function of the contents of said ring counter.

9. A self-organizing control system as set forth in claim 5 wherein said second means includes means for computing the numerical difference between said error signal and established thresholds.

10. A self-organizing control system as set forth in claim 6 wherein said second means includes means for computing the numerical difference between said error signal and established thresholds.

11. A self-organizing control system as set forth in claim 9 wherein said third means includes means to compute large changes in said estimated value of an unknown parameter under conditions of said numerical difference being small and small changes in said estimated value under conditions of said numerical differences being large.

12. A self-organizing control system as set forth in claim 10 wherein said third means includes means to compute large changes in said estimated value of an unknown parameter under conditions of said numerical difference being small and small changes in said estimated value under conditions of said numerical differences being large.

13. A self-organizing control system as set forth in claim 1 further including seventh means including sinusoidal and cosinusoidal wave generators to actuate said controlled object.

14. A self-organizing control system as set forth in claim 13 including eighth means including means for computing a function of the amplitudes of said waves.

15. A self-organizing control system as set forth in claim 1 further including eighth means including limit means for limiting the magnitude of said actuation signals.

* * * * *